No. 835,170.
PATENTED NOV. 6, 1906.
W. T. VAN DORN.
RAILWAY CAR.
APPLICATION FILED MAY 12, 1906.
5 SHEETS—SHEET 1.
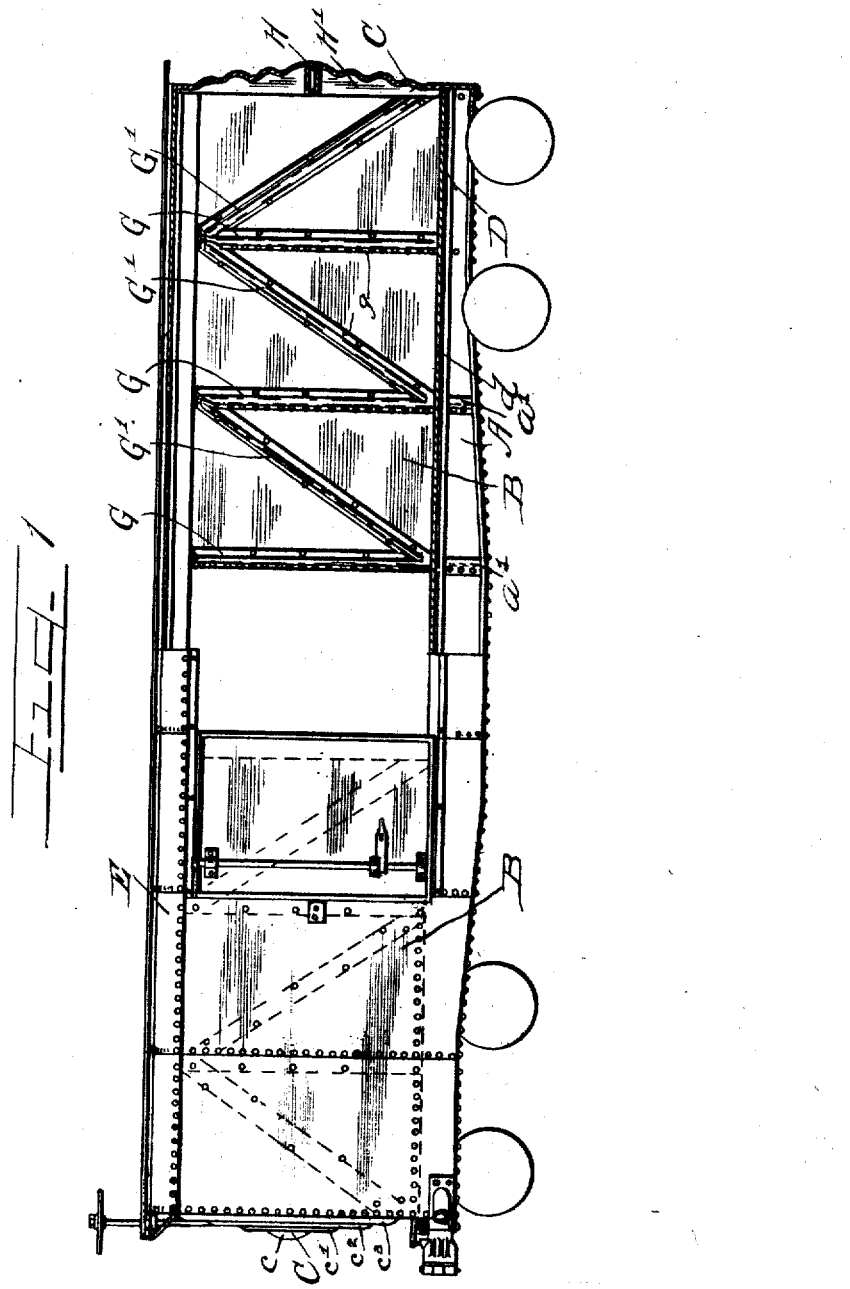

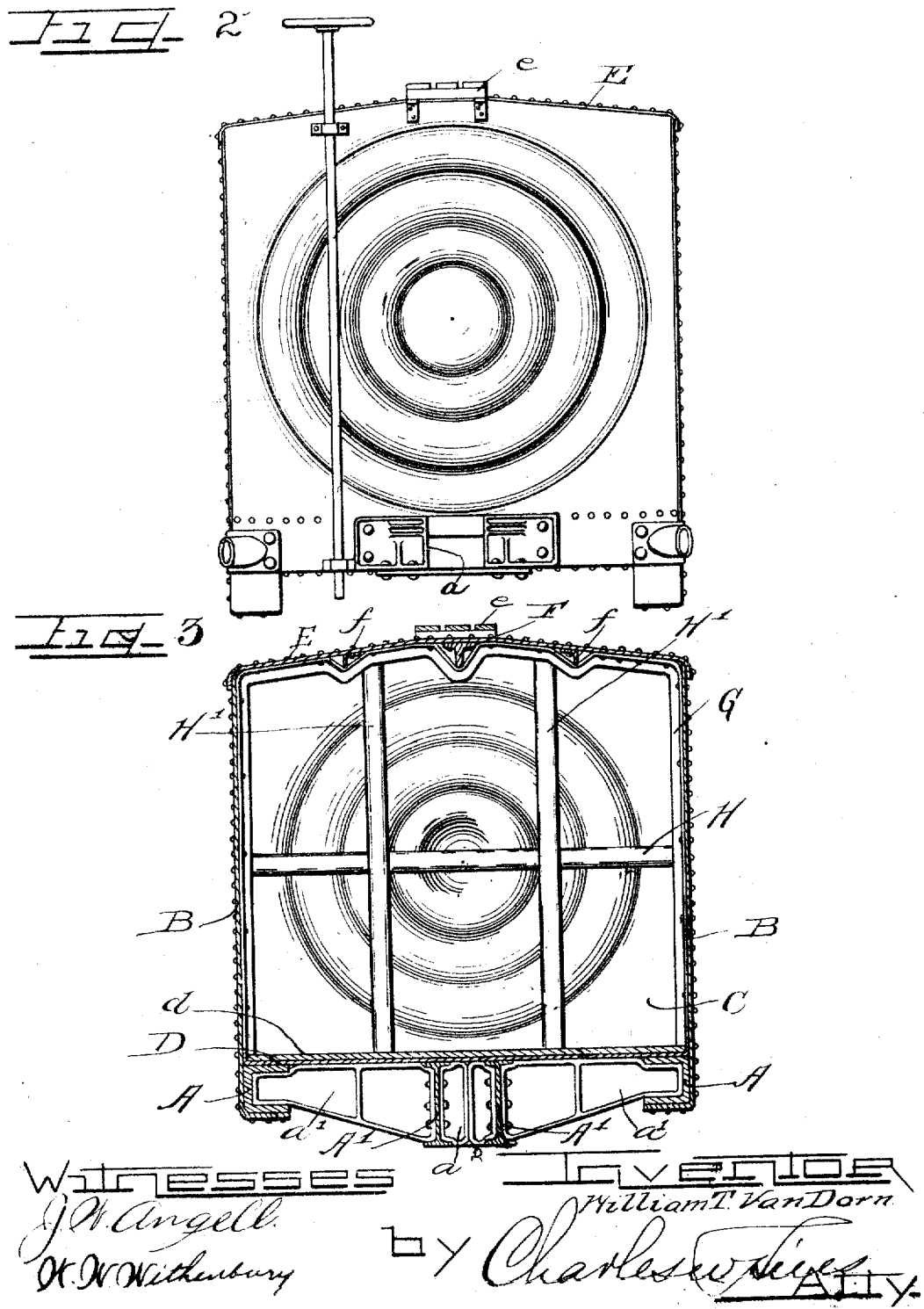

No. 835,170. PATENTED NOV. 6, 1906.
W. T. VAN DORN.
RAILWAY CAR.
APPLICATION FILED MAY 12, 1906.
5 SHEETS—SHEET 3.
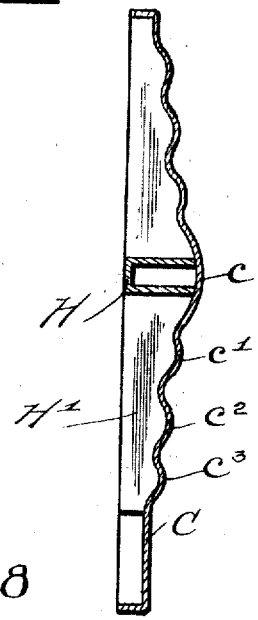
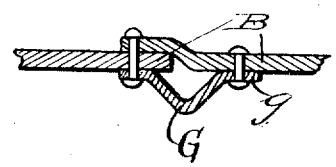
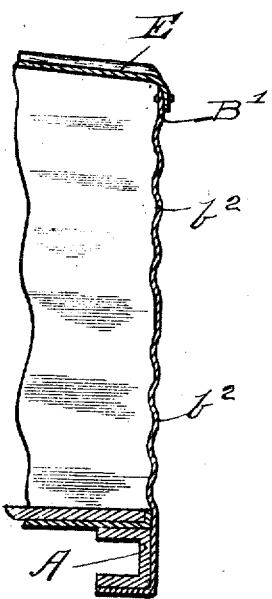
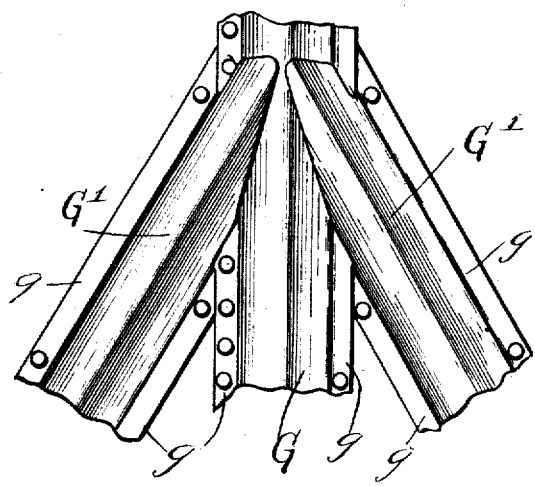
Witnesses:
J. W. Angell
H. W. Withenbury
Inventor:
William T. Van Dorn
by Charles W. Fies
Atty.

No. 835,170. PATENTED NOV. 6, 1906.
W. T. VAN DORN.
RAILWAY CAR.
APPLICATION FILED MAY 12, 1906.
5 SHEETS—SHEET 4.
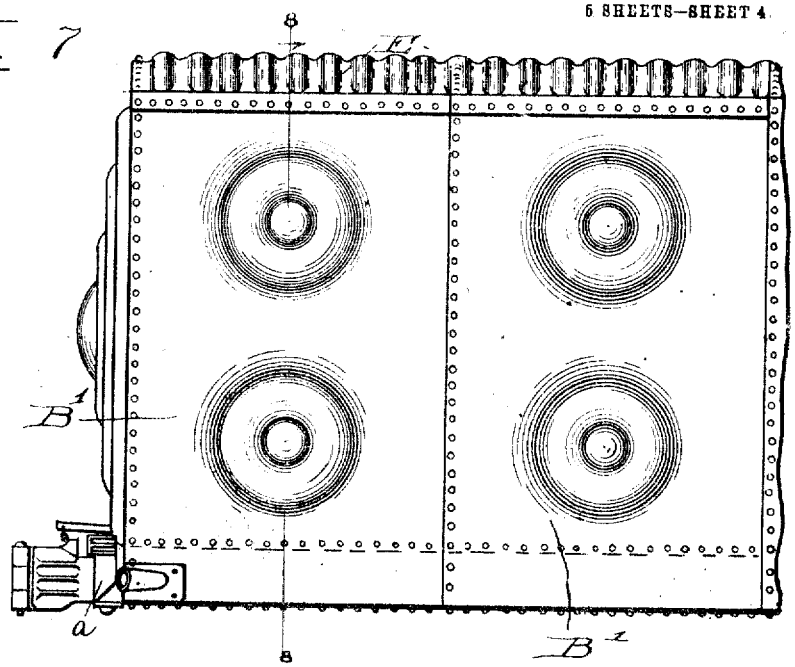
FIG. 7
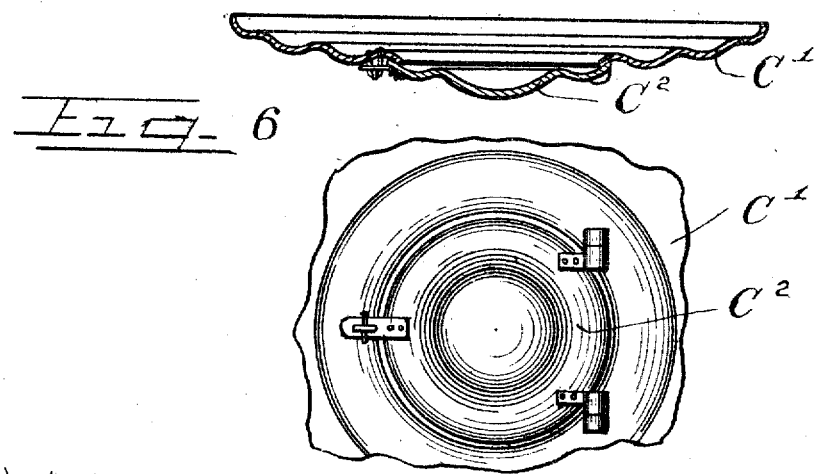
FIG. 5
FIG. 6
WITNESSES
J. W. Angell
N. W. Withenbury
INVENTOR
William T. Van Dorn
by Charles Fertick Atty.

No. 835,170. PATENTED NOV. 6, 1906.
W. T. VAN DORN.
RAILWAY CAR.
APPLICATION FILED MAY 12, 1906.
5 SHEETS—SHEET 5.
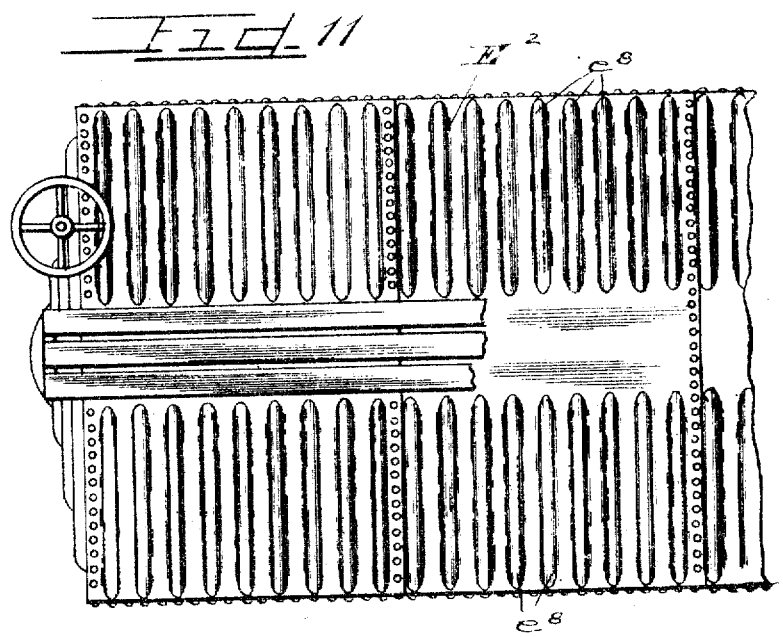
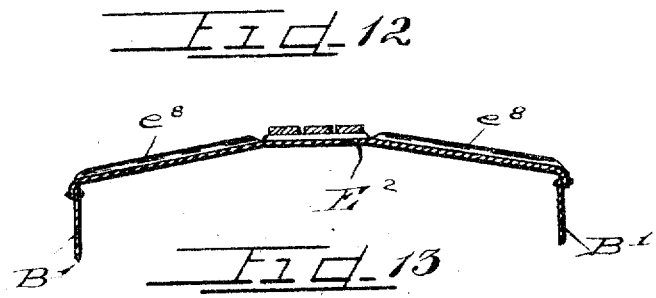
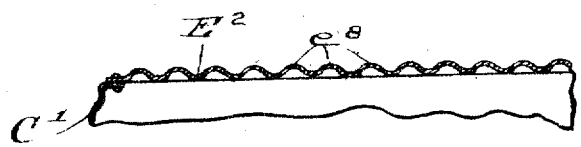
WITNESSES
J. W. Angell
W. W. Withenbury
INVENTOR
William T. Van Dorn
by Charles W. Hill Atty.

UNITED STATES PATENT OFFICE.

WILLIAM T. VAN DORN, OF CHICAGO, ILLINOIS.

RAILWAY-CAR.

No. 835,170.

Specification of Letters Patent.

Patented Nov. 6, 1906.

Application filed May 12, 1906. Serial No. 316,478.

*To all whom it may concern:*

Be it known that I, WILLIAM T. VAN DORN, a citizen of the United States, and a resident of the city of Chicago, in the county of Cook and State of Illinois, have invented certain new and useful Improvements in Railway-Cars; and I do hereby declare that the following is a full, clear, and exact description of the same, reference being had to the accompanying drawings, and to the letters of reference marked thereon, which form a part of this specification.

This invention relates to improvements in railway-cars, and more particularly to railway-cars constructed of metal, such as steel.

Heretofore railway-cars have been constructed either of wood or partly of wood and partly of steel, known as the "composite" construction, or wholly of steel, as is the case with many kinds of flat or gondola cars and dumping-cars; but the ordinary box-car or passenger-cars are still constructed almost wholly of wood, except, perhaps, the underframe for the cars. These constructions in which wood is wholly or largely used have resulted in frightful accidents, owing to the burning of wrecks before the passengers or train-crew can be extricated, and aside from the loss of life and property thus occasioned and the suffering entailed, owing to the structural weakness of such construction, have resulted in large annual expense for reconstruction and maintenance each year. The increased weight of rolling-stock has not been adequately met by increased strength in car construction, and in consequence the ordinary use of cars soon wears them out and breaks them up.

It is particularly noticeable upon visiting a railroad-yard that the ends of cars, however constructed, are subjected to the greatest stresses and receive the greatest damage, and it is rare to inspect a large number of cars without finding a considerable percentage with the ends and corners either broken away entirely or badly shattered and damaged.

With this in view the object of my invention is to provide a car adapted for use for passenger, freight, mail, baggage, or express use constructed wholly of steel and to strengthen and reinforce the same in such manner as to afford great strength at the points of greatest stress and shock—namely, at the ends—thereby obviating eighty per cent. of the repairs otherwise necessary.

It is a further object of my invention to afford a construction in which the sides are constructed of plates of any suitable width and some of which have a length equal to the total height of the side of the car and extend downwardly and are riveted beneath and to the side sills.

It is a further object of my invention to construct a car each plate of the roof of which exends entirely across the car, affording the arch for the roof, and is flanged downwardly on the side plate and riveted thereto.

It is also an object of the invention to afford an exceptionally strong interior metallic body-frame for the car, increasing enormously the strength of the same.

It is the purpose of my invention to so construct the car and inclose it for any purpose as to render the same practically indestructible, and while affording a relatively light car to so arrange and construct the inner car-frame members as to afford a maximum amount of space within the car.

The invention embraces many novel features, and consists in the matters hereinafter described, and more fully pointed out and defined in the appended claims.

In the drawings, Figure 1 is a side elevation, partly in longitudinal section, of a car embodying my invention, showing the same constructed as a box-car. Fig. 2 is an enlarged end elevation of the car-body. Fig. 3 is a transverse section thereof. Fig. 4 is a central vertical section of one of the car ends. Fig. 5 is a transverse section of the same, showing the end provided with a central hinged door. Fig. 6 is a fragmentary face view of the same. Fig. 7 is a fragmentary view, in side elevation, showing the side of the car provided with reinforcing and stiffening corrugations similar to the ends of the car. Fig. 8 is a vertical section taken on line 8 8 of Fig. 7. Fig. 9 is an enlarged transverse section illustrating the joint between adjacent plates and the inner reinforcing-ribs of the frame members. Fig. 10 is an enlarged fragmentary detail of one of the joints of the inner truss-frame. Fig. 11 is a fragmentary top plan view showing the corrugated roof. Fig. 12 is a transverse section of the same. Fig. 13 is a longitudinal section thereof.

As shown in the drawings, the underframe of the car comprises pressed-steel inwardly-facing channels A, affording the side sills and I-beam center sills A'. The end sills $a$ may be constructed as channels, if desired. The transverse sills $a'$ intermediate the end sills $a$ are of pressed steel and comprise transverse sections shaped to fit into the channel of the side sills and between the flanges and against the webs of the center sills and, as shown, adapted to be rigidly secured in place, with suitable filling-sections $a^2$ between the I-beam center sills, by means of rivets or bolts.

Metal plates B, preferably of a width approximately an exact divisor of length of the car, are flanged at the bottom to engage beneath the side sills and are riveted upwardly through the lower flanges thereof and are of a length to extend to the roof of the car. Said plates B overlap and are riveted to each adjacent plate. Should windows or door-openings be required in the side walls, the same may be provided by cutting away of a plate or plates or by the omission or part omission of one or more plates between the top of the side sill and the car-top. The ends of the car are similarly secured beneath the end sills, and each of said ends comprises a single plate of pressed metal of the requisite thickness and size to afford the entire end of the car and is flanged at the edges to extend beneath the end sill and extend within the side plates and the top of the car. Said ends are pressed outwardly at the center to afford concentric corrugations in bull's-eye form, which project outwardly and the outermost corrugation or rib of which coincides approximately or as near as may be with the sides, top, and bottom of each end plate, as shown in Figs. 3 and 4. Said corrugation, as shown, provides an outwardly-pressed convex center of the bull's-eye $c$ and concentric rounded ridges of progressively less projection, (indicated by $c'$, $c^2$ $c^3$,) and obviously any desired number of such corrugations may be provided. Each of said ribs or corrugations braces the adjacent portion of the plate. In consequence the plate when formed presents, in effect, a trussed or bracing construction, and to press said corrugations inwardly would necessitate spreading the entire end of the car. Should it be desired, a central door $C^2$ may be provided in each of said end plates, as indicated in the end plate C', and comprises the first two corrugations. Said door, as shown, is hinged, but may be otherwise secured to the plate, and when engaged in place is of such strength as to resist all blows or impacts likely to be delivered thereto. The bottom or floor of the car comprises metallic plates D, which are of a length to extend transversely of the car and afford flanges at each end thereof for riveting to the side plates. If desired, said plates may be covered with any suitable fireproof composition or wood $d$, particularly in the case of passenger, express, baggage, or mail cars, though, of course, a wooden floor is not necessary.

The top of the car comprises plates E of a length to extend transversely for the entire width of the car and to flange down over the side plates, as shown in Fig. 3. Said plates are riveted to the upper ends of the side plates for the entire length of the car and overlap each other at the seam, as do the side plates, and are arched upwardly at the center to afford the usual fall or pitch of the car-roof. Secured on said roof is the usual central walk $e$ for the train-crew.

Obviously the car constructed as described, with the bottom, side plates, end plates, and top plates rigidly engaged together and overlapping each other, affords great strength. However, an interior or inner body-frame is provided, to which said plates are riveted. This, as shown, comprises a central longitudinal ridge or rib F, comprising a T-bar the length of the car and which, as shown, is riveted through its flanges into the middle of the top or roof, and the web projects downwardly. On each side of the same and intermediate said ridge and the side walls of the car are angles $f$, the webs of which project downwardly. Extending peripherally around the interior of the car at each seam or joint from the floor upwardly along the side and around the roof and down on the opposite side are bars or girths G, which, as shown in Fig. 9, are angle-bars provided with laterally-directed flanges $g$, lying in substantially the same plane and through which, as shown, the same are riveted to the side and top plates. The flanges $g$ being riveted to adjacent plates they add enormously to the strength of the construction. As shown also, said bars or girths are bent downwardly to pass beneath and bear upwardly against the webs of said angle-bars $f$ and the T-bar F without cutting, and thus brace and support the roof. Braces or truss-bars G', constructed of angle-bars similar to the angle-bars G and likewise provided with laterally-directed flanges $g$, are cut at their ends to fit to said vertical angle-bars and extend obliquely across and are riveted to each of the side plates, extending from the bottom of one of said vertical bars G to the top of the adjacent.

Each of the ends in which a door is not provided is braced by a transverse channel-beam H of pressed steel shaped to fit the ends of the car, as shown in Figs. 3 and 4, and which is rigidly secured thereto by riveting or in any suitable manner. Bearing against the same are upright channels or bars which extend from the floor to the roof of the car and bear against said bar H and against the end plate and serve to rigidly brace the entire end. Of course if a door is provided through the end at its center, as shown in Figs. 5 and 6, two of said bars H will be used, one above and the other below the center. In the construction shown in Figs. 7 and 8 side plates B' of the car are likewise provided with concentric corrugations of bull's-eye. These may be arranged in any desired manner and number in the plate, though, owing to the plates being narrower and the desirability of maintaining the uniformity of width of the car, the bull's-eye or corrugations are relatively small in diameter, and several are arranged closely upon each plate.

The operation is as follows: The sides being rigidly riveted to the channeled side sills and rigidly secured to the floor-plates are exceedingly strong along the floor of the car. These plates being made of sufficient gage and each of the seams or joints being reinforced by the angle-bars G and the bracing members G' and braced by the roof, which flanges down over the same, it follows that even though the car be made entirely of plain sheets enormous strength in proportion to weight would be secured. However, by forming in the ends and possibly in the sides concentric corrugations pressed from the plate said corrugations, as is well known, enormously stiffen the plate and add enormously to the strength of the same to resist impact, and this increase in strength or resisting power is provided at the ends of the car where, as is well known, impact is most severe. As shown, the roof $E^2$ is also formed of plates which have pressed corrugations therein on each side of the running-board. This is of course of great value in stiffening the construction and enables a light but very strong roof to be made.

In the construction shown it is obvious that though the weight of the car end plate is proportionately not greater than the weight of the side plates its power to resist impact without deformation very greatly exceeds the resisting power of the side plate employed. If desired, such ends may be provided in existing wooden car-bodies, thus greatly increasing the strength of the construction.

While I have shown in the drawings an ordinary freight-car constructed in accordance with my invention, as clearly herein indicated, I do not purpose limiting this application to any particular type of car, as it is obviously adaptable for passenger, mail, and express services, as well as for freight and baggage use, and obviously when so used necessary car-openings may be provided where desired, and of course a wooden floor is in no sense necessary and may be dispensed with, in which event no material of a combustible nature enters into the structure of the car.

Obviously any suitable metal may be used and details of construction may be varied without departing from the principles of my invention.

I claim as my invention—

1. A metallic car-body provided with pressed-steel metallic ends projecting outwardly at the center and corrugated concentrically.

2. A car-body of the class described wherein one or more of the metal plates forming the same is provided with concentric outwardly-pressed corrugations.

3. A car-body of the class described comprising plates riveted together to afford the side and end walls some of said plates being corrugated in concentric outwardly-pressed corrugations.

4. A metallic car-body, the ends of which are provided with outwardly-pressed concentric corrugations.

5. A metallic car-body comprising overlapping side and end plates some of which are corrugated concentrically.

6. A car-body of the class described comprising overlapping end and side plates riveted together, a metallic reinforcement covering the joint and riveted to each plate at each joint, one or more of said plates being corrugated and pressed outwardly at the corrugation said corrugations increasing in size toward the center of the plate.

7. In a car of the class described, a metal end, pressed outwardly at the center in concentric corrugations.

8. In a car of the class described, pressed-steel ends, flanged to engage within the side and roof plates and to the sill and outwardly-pressed concentric corrugations therein, reinforcing and stiffening said ends.

9. In a car of the class described corrugated pressed-steel ends affording outwardly-pressed corrugations of a bull's-eye form.

10. A car of the class described provided with pressed-steel ends affording outwardly-pressed concentric corrugations bracing the end of the car and a door at the center of the bull's-eye.

11. In a pressed-steel-car construction the combination with channeled inwardly-facing side sills, of side walls comprising overlapped plates of steel riveted along the joints and riveted to the lower flange of the channel, side sills, a floor of sheet metal within the car flanged and riveted to the opposite side plates of the car.

12. In a pressed-steel-car construction the combination with channeled inwardly-facing side sills, of side walls comprising overlapped plates of steel riveted along the joints and riveted to the lower flange of the channel, side sills, a floor of sheet metal within the car flanged and riveted to the opposite side plates of the car and a roof comprising transverse roof-plates of a length to flange down, over and rivet to the corresponding side plates and arched to afford the pitch of the roof.

13. In a pressed-steel-car construction the combination with channeled inwardly-facing side sills, of side walls comprising overlapped plates of steel riveted along the joints and riveted to the lower flange of the channel side sills, a floor of sheet metal within the car flanged and riveted to the opposite side plates of the car and a roof comprising transverse roof-plates of a length to flange down over and rivet to the corresponding side plates and arched to afford the pitch of the roof and a central longitudinal rib of structural metal supporting the center of the roof.

14. In a pressed-steel-car construction the combination with channeled inwardly-facing side sills, of side walls comprising overlapped plates of steel riveted along the joints and riveted to and beneath the lower flange of the channel side sills, a floor of sheet metal within the car flanged and riveted to the opposite side plate of the car, a roof comprising transverse roof-plates of a length to flange down over and rivet to the corresponding side plates and arched to afford the pitch to the roof, a central longitudinal ridge of structural metal supporting the center of the roof, and reinforcing structural bars riveted to adjacent plates and extending peripherally around the interior of the car at each seam or joint.

15. In a pressed-steel-car construction the combination with channeled inwardly-facing side sills, of side walls comprising overlapped plates of steel riveted along the joint and riveted to the lower flange of the channel side sills, a floor of sheet metal within the car flanged and riveted to the opposite side plate of the car, a roof comprising transverse roof-plates of a length to flange down over and rivet to the side plates and arched to afford the pitch of the roof, a central longitudinal ridge of structural metal supporting the center of the roof and reinforcing structural bars riveted to adjacent plates to reinforce the same at the joints and extending peripherally around the interior of the car at each seam and bent to extend beneath the reinforcing and supporting members for the roof.

16. In a pressed-steel-car construction the combination with steel side sills, of side walls comprising overlapped plates of steel riveted along the joint and riveted to the side sills and a floor of sheet metal within the car flanged and riveted to the side plates, a roof comprising transverse roof-plates of a length to flange down over and rivet to the side plates and arched to afford the pitch to the roof, a central longitudinal ridge of structural metal supporting the center of the roof and reinforcing structural bars riveted to adjacent plates and extending peripherally around the interior of the car at each seam and bent to extend beneath the supporting members of the roof and diagonal truss members riveted to the side plates and extending from the bottom of one joint to the top of the next.

17. A car of the class described embracing a structural metal underframe, plates riveted thereto and to corresponding roof-plates and pressed-steel-car ends each comprising an outwardly-bulging center in bull's-eye form.

18. A car of the class described embracing a structural metal underframe, plates riveted thereto and to corresponding roof-plates and pressed-steel-car ends each comprising an outwardly-bulging corrugated portion of bull's-eye form.

19. A car of the class described embracing a structural metal frame, side plates riveted thereto and to corresponding roof-plates and pressed-steel-car ends each having a central bulging corrugated portion and reinforcing members within the car and acting to strengthen the same.

20. A car of the class described embracing channeled pressed-steel side sills, side plates mutually overlapping each other and flanged to extend beneath and to rivet to the lower flange of the sill, bottom plates flanged to rivet at their ends to opposite side plates, top plates flanging over the side plates and riveted thereto and reinforcing members riveted to adjacent side plates and roof-plates and covering the joint, said reinforcing members comprising each an angle-bar flanged at its edge to engage on each plate.

21. A structural-steel and sheet-metal car having in its side and ends pressed, concentric corrugations projecting therefrom.

22. In a car, pressed-steel corrugated ends the corrugations thereof increasing in size centrally of the same.

23. In a railway-car concentrically corrugated end plates of metal.

24. In a metallic car, corrugated ends, said corrugations extending concentrically from the middle.

25. In a car, a corrugated metal car end bulging outwardly at its center and metallic braces on the inner side thereof.

26. A steel car having pressed corrugations in the ends, sides and top said end corrugations decreasing in size from the center outwardly.

27. A metallic car having corrugated ends and ribbed corrugations on each side of the roof beyond the running-board.

28. A car of the class described having pressed corrugations in its roof extending from its side to the running-board.

29. In a car of the class described, a body-frame, side and end walls of sheet metal, flanged and riveted beneath the margins of the frame and a roof flanged over said walls, there being outwardly-pressed concentric corrugations in said walls decreasing in size from the center outwardly.

30. In a car of the class described, a body-frame, side walls thereon, a roof supported on the side walls and outwardly-dished end walls having concentric corrugations therein.

31. In a car of the class described the combination with a body-frame, of a plurality of sheets of metal riveted beneath the same and extending upwardly therefrom, and each having a plurality of concentric corrugations therein, dished car ends and a roof supported on said sides and ends.

32. A car having corrugated, metallic ends, each dished from the margin centrally.

33. A car of the class described, having corrugated metallic side and end walls, said end walls being dished centrally.

34. A car of the class described having structural sills, side plates engaged thereto and to each other, end plates engaged to said sill and the adjacent side plates, said plates having corrugations and the corrugations of each plate being on a different plane, an opening in said end plate, a corrugated convex roof engaged to the sides and end plates, a plurality of structural braces for said roof and braces for the sides of said car each supporting the braces of the roof.

35. A car of the class described having metallic sills of side plates engaged thereto and to each adjacent side plate, end plates engaged to said sills and the adjacent side plates, said plates having concentric corrugations, convex corrugated top plates engaged to said side and end plates, interior structural braces for said roof, braces strengthening said side and end plates, and supporting the roof-braces and auxiliary braces for said side braces.

In testimony whereof I have hereunto subscribed my name in the presence of two subscribing witnesses.

WILLIAM T. VAN DORN.

Witnesses:
W. W. WITHENBURY,
WM. C. SMITH.